(No Model.)
T. WHEATLEY.
PNEUMATIC TIRE.
No. 598,212. Patented Feb. 1, 1898.
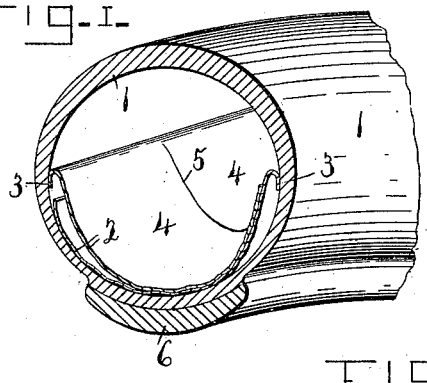
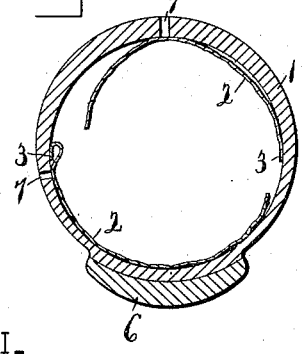
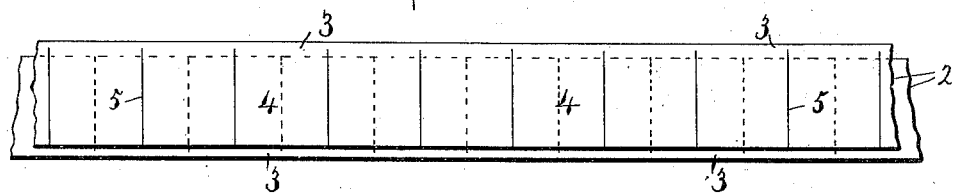
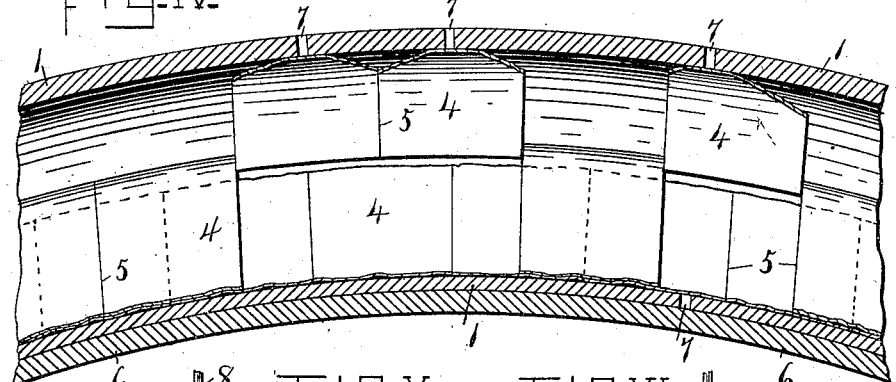
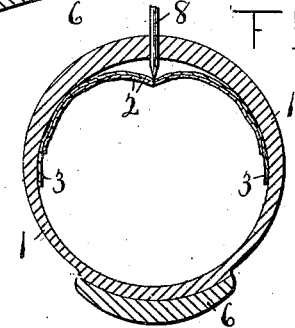
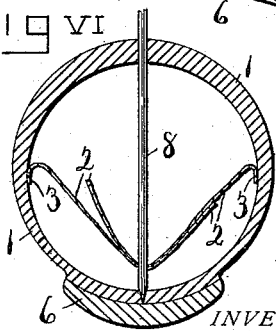
WITNESSES:
O. Schoeneck.
L. F. Weisburg.
INVENTOR.
Thomas Wheatley
BY Alfred Wilkinson
ATTORNEY.

UNITED STATES PATENT OFFICE.

THOMAS WHEATLEY, OF SYRACUSE, NEW YORK, ASSIGNOR TO THE OLIVE WHEEL COMPANY, OF SAME PLACE.

PNEUMATIC TIRE.

SPECIFICATION forming part of Letters Patent No. 598,212, dated February 1, 1898.

Application filed May 18, 1896. Serial No. 591,945. (No model.)

*To all whom it may concern:*

Be it known that I, THOMAS WHEATLEY, a citizen of the United States, residing at Syracuse, in the county of Onondaga and State of New York, have invented a new and useful Pneumatic Tire; and I do hereby declare that the following, in connection with the accompanying drawings, is a full, clear, and exact description of the invention.

What I have invented is a new and improved construction of pneumatic tire for bicycles or other vehicles, by which punctures may be easily and quickly repaired by the rider without removing the tire from the wheel.

The use of my invention does not increase the weight of the tire perceptibly and may be applied to any form of tire, either inner tube or single tube. It consists in the use of two strips of very light thin rubber, which are attached each by one edge to opposite sides of the interior wall of the tube, preferably along a longitudinal line about midway between the tread side and the rim side of the tube. Each strip is as long as the tube, so they both extend throughout the whole tube continuously, and each has one entire edge by which it is cemented to the inner wall, the remainder or free portion, which is much wider than the cemented portion, being split up into flaps of any desirable width, which hang freely within the tube, the air-pressure being the same on all sides of them, the centrifugal force, however, tending to throw them out toward the tread side when the wheel is in motion. These strips being cemented one on each side, one overlies the other, the slits between the flaps being arranged alternately, as shown in the drawings, so that the slits or cuts in the two strips do not correspond, but the flaps of one overlie the slits of the other, and vice versa. By this arrangment the flaps of one strip may be drawn toward the tread side of the tire and the flaps of the other toward the rim side, when desired, covering substantially the whole interior surface, so that a puncture at any point may be patched from the interior.

The advantages of my invention lie in the ease with which a puncture is patched from the interior by means of a flap, wherever the puncture may be, whether on the tread, under the rim, or on the side between tread and rim, and also in the possibility of patching punctures exactly opposite each other. Punctures on the tread are the most common, but it is also common for the puncturing article to pass entirely through the tire, puncturing it on the opposite side, and it is in such cases that my invention is of great use. A puncture under the tread, as by cutting of inner tube by lacing or other reason, is not uncommon.

In case of a single puncture at any point on the tire this is patched by injecting cement through the puncture, preferably from below, then squeezing the deflated tire flat at that point, by which means one flap of one strip or the other is cemented over the puncture on the interior. In Figure II a tread-puncture and a side-puncture in the same cross-section are shown patched, one by a flap of one strip and one by a flap of the other. In Fig. IV on the left two neighboring tread-punctures are shown cemented by adjacent flaps of the same strip. In case the tire is simultaneously punctured on opposite sides the foreign body, as a nail or thorn, passing through both sides of the tire and also through both strips, one puncture may be patched by a flap of one strip, the opposite puncture by a flap of the other. As before said, the flaps hang freely, but by centrifugal force are thrown against the tread side when the wheel is moving. Being, however, very thin and light, the strips are not forced against the interior of the tube with any great pressure. Therefore when the foreign body perforates the rigid wall of the inflated tube and passing through perforates the opposite side and both strips as well it first presses the light strips away from the tread side of the tube, and when it finally passes through them it will be at a point not in line with the holes through the walls of the tire, so when the strip is drawn up to patch the puncture, either on the tread side or on the opposite side, the hole in the strip will not register with the hole in the tube, and the utility of the strips and flaps to patch the punctures in question is not destroyed. In this case the tread-puncture is patched, as just described, by a flap of one strip. Then the tire is stripped from the rim, a few inches on each side of the rim-puncture being generally sufficient, cement is injected through that puncture, the tire is pressed flat against the rim at that point, and a flap of the other strip is cemented over the rim-puncture. The manner in which a double puncture is formed is shown in Figs. V and VI.

My invention will be better understood by means of the accompanying drawings, to which I have referred. In these the same numbers refer to the same parts in all the views. Fig. I is an isometric view of the interior of a tire provided with my invention. Fig. II is a cross-section of such a tire, showing two punctures, one side and one tread, patched by my peculiar flaps. Fig. III is a reduced plan view of a portion of my strips detached, showing how the flaps are arranged over the slits. Fig. IV is a longitudinal section of a tire provided with my invention, showing three tread-punctures and one opposite rim-puncture. Figs. V and VI show the process of puncturing, the strips being thrown against the tread side by the motion of the wheel.

In the figures, 1 indicates the tube of the tire, 2 2 the respective strips, one attached on each side and one overlying the other. These strips have each one edge 3 entire and the remainder or greater width divided into flaps 4 4 by cuts or slits 5 5. These strips are each cemented by one edge—that is, by the entire edge 3—on the interior wall of the tube, preferably along the side wall midway between the tread side and the rim side, the flaps of one strip overlying and covering slits in the other.

6 indicates the rim, 7 7 7 the punctures, and 8 the puncturing-nail.

In the drawings my invention is shown applied to a single-tube or "hose-pipe" tire; but it is evident that it may be applied to the inner tube of a double-tube tire. It is also evident that the advantages of my invention may be obtained to an extent by the use of only one strip, but imperfectly. I will suggest that it is not absolutely necessary to split the strips up into flaps; but this construction is better than leaving each strip entire, as it permits the strips to adapt themselves more freely to interior of the tube and prevents wrinkling. If one flap overlies the adjacent flaps, no harm is done. In case of two successive punctures at the same spot the first will be patched by a flap of one strip and the second by a flap of the other.

Having thus fully described my invention, what I claim, and desire to protect by Letters Patent, is—

1. The combination with a pneumatic or hollow vehicle-tire of two longitudinal bands of thin rubber attached to the integral wall of the tire on opposite sides, each by one narrow edge, and each band having its wider portion hanging free in the interior of the tube unaffected by the air-pressure when the wheel is at rest, but thrown outwardly by centrifugal force when the wheel is in motion; each free portion being cut up into distinct flaps and being of sufficient width to cover one-half of the inner surface of the tube when drawn against it so that opposite punctures may be patched.

2. In a pneumatic bicycle-tire, two strips of the length of the tire attached each by one edge to the interior wall of the tire on opposite sides, each strip having its wider unattached portion hanging free in the tube and cut by slits from the margin into distinct flaps, the strips overlying each other so that the flaps of one strip cover the slits in the other, substantially as described and shown.

In witness whereof I have hereunto set my hand, in the presence of two attesting witnesses, at Syracuse, in the county of Onondaga, in the State of New York, this 14th day of May, 1896.

THOMAS WHEATLEY.

Witnesses:
   CONRAD SCHOENECK,
   L. F. WEISBURG.